Nov. 10, 1925.  
W. A. KLINGBERG  
WINDSHIELD  
Filed March 15, 1924   2 Sheets-Sheet 1
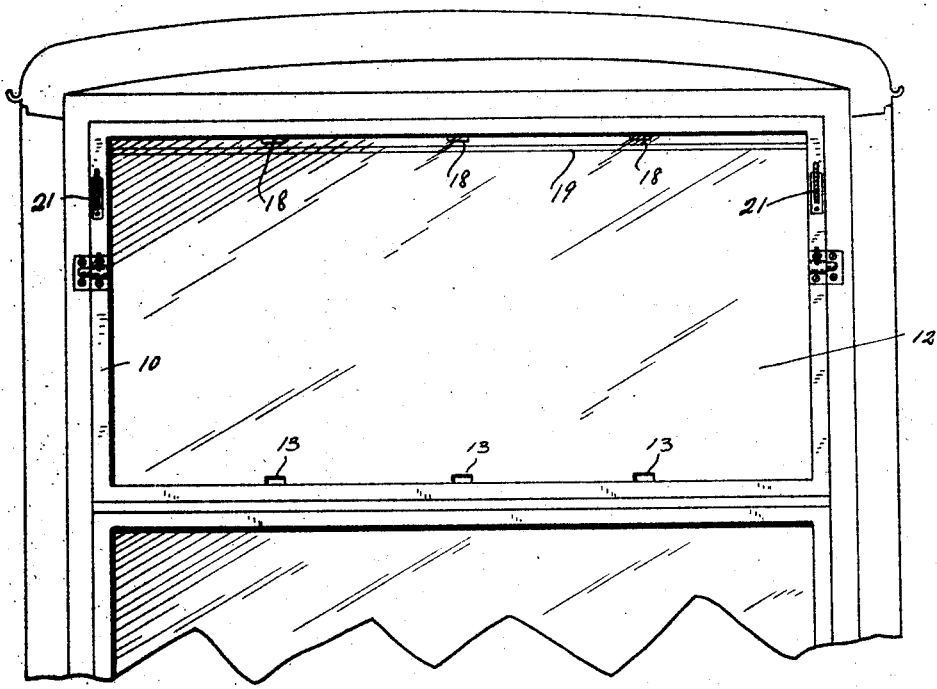
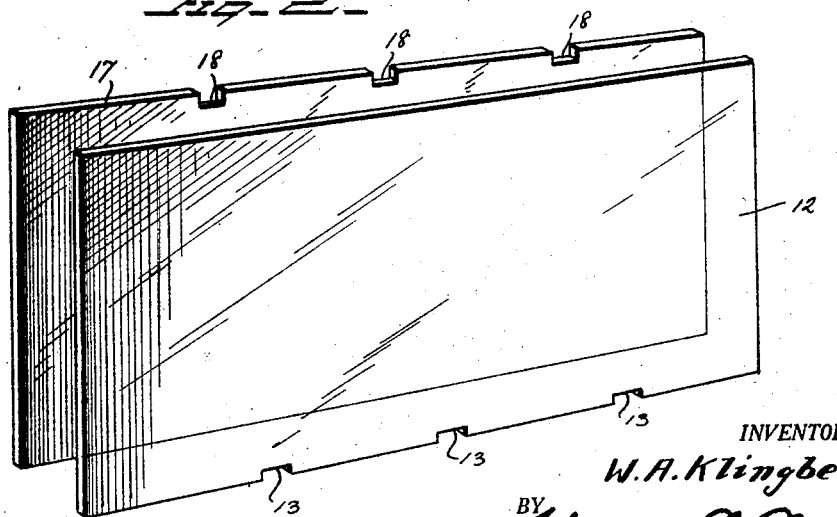
INVENTOR.  
W. A. Klingberg  
BY Watson E. Coleman  
ATTORNEY.

Nov. 10, 1925.
W. A. KLINGBERG
WINDSHIELD
Filed March 15, 1924
1,560,585
2 Sheets-Sheet 2
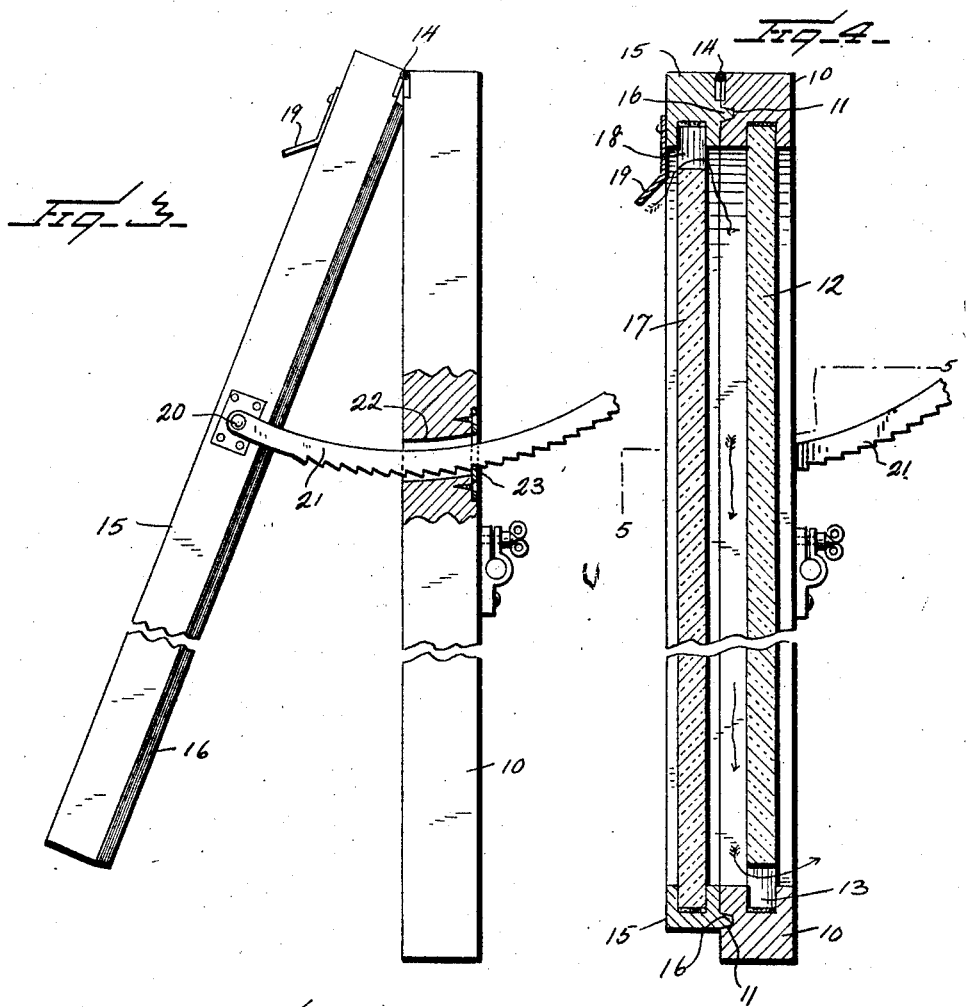
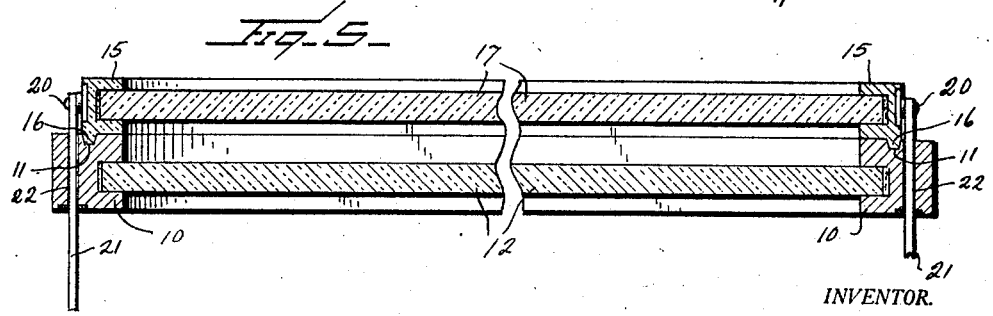
INVENTOR.
W. A. Klingberg
BY
Watson E. Coleman
ATTORNEY.

Patented Nov. 10, 1925.

1,560,585

UNITED STATES PATENT OFFICE.

WILLIAM A. KLINGBERG, OF AFTON, OKLAHOMA.

WINDSHIELD.

Application filed March 15, 1924. Serial No. 699,522.

*To all whom it may concern:*

Be it known that I, WILLIAM A. KLINGBERG, a citizen of the United States, residing at Afton, in the county of Ottawa and State of Oklahoma, have invented certain new and useful Improvements in Windshields, of which the following is a specification, reference being had to the accompanying drawings.

This invention relates to a construction for the windshields of vehicles of all types and particularly for the windshields of automobiles.

An important object of the invention is to provide a device of this character which in itself provides what is commonly known as a clear vision shield, that is to say, a windshield in which the collection of frost upon the outside of the windshield is to a great extent eliminated and in which a portion of the shield is adjustable so that by adjusting this portion and thereby changing the angle of refraction of the rays of the headlights of oncoming vehicles, these rays may be so directed that they will not annoy the driver.

A further object of the invention is to provide a double sash structure of this character in which the construction is such that the outer or adjustable section of the windshield may be held in any desired position including a position where it is disposed adjacent and parallel with the stationary portion thereof, the construction being such that rattling of the shiftable shield in the latter named position is effectually prevented.

A further object of the invention is to provide in an automobile sash structure of this character means for permitting small quantities of air to ventilate the vehicle.

These and other objects I attain by the construction shown in the accompanying drawings, wherein for the purpose of illustration is shown a preferred embodiment of my invention and wherein:—

Figure 1 is a front elevation of a windshield, the upper section of which is constructed in accordance with my invention;

Figure 2 is a combined perspective of the panes of the inner and outer frames of the windshield;

Figure 3 is a side elevation of the upper section of the windshield removed, parts being broken away to show the adjusting mechanism;

Figure 4 is a vertical sectional view taken through the windshield;

Figure 5 is a transverse sectional view therethrough.

Referring now more particularly to the drawings, the numeral 10 indicates a rectangular frame forming the frame of the inner sash of the windshield, this frame being provided in its outer sash with a continual groove 11 for a purpose presently to appear. The frame supports a transparent sheet 12, preferably of glass, and this sheet adjacent the lower end thereof and preferably immediately adjacent the frame 10 is provided with a series of spaced apertures 13 the purpose of which will presently appear. Pivoted to this inner sash member along the upper edge thereof, as at 14, is an outer sash frame 15 having upon its inner edge an outstanding flange 16 adapted to enter the groove 11 of the inner sash frame 10 when the frames are swung into parallel relation. This frame, like the outer frame member, carries a transparent sheet, indicated at 17, and this sheet immediately adjacent the upper run of the frame is provided with air inlet notches 18. The upper run or cross member of the outer frame has secured thereto an outwardly and downwardly inclining strip 19 forming a hood preventing the entrance of water through the ports 18.

Pivoted to the vertical run of the outer frame 15, as at 20, are rearwardly projecting rack arms 21 the teeth of which are formed upon the under surfaces thereof. These rack arms are directed through slots 22 formed in the vertical runs of the inner stationary frame 10 and coact with a tooth engaging pin 23 to maintain the outer frame in any desired position. The entire assembly as thus described may be pivotally mounted after the manner of the windshield sections of windshields of the ordinary construction by extending the pivot into engagement with the frame 10 of what has been referred to as the stationary frame member, it being understood that in referring to the frame 10 as the stationary frame member reference is had to the co-operation between the frames 10 and 15.

In the use of the device during daylight driving the frames 10 and 15 can be locked in parallel relation and a very solid joint can be had therebetween due to the provision of a flange 16 upon the frame 15, this flange being engaged in the groove 11 of the frame 10. With the windshield sections in this position, attention is directed to the fact that a small portion of air will be admitted to the car during operation thereof, air entering between the glass of the sections through the ports 18 and passing to the car from between these glasses to the ports 13. This passage of air will serve to prevent sweating of the lenses and will also tend to prevent frosting of the outside of the lenses when applied to closed cars which are being operated in cold weather. During night driving the outer frame 15 can be adjusted to such an angle that rays from the headlights of oncoming vehicles are deflected so that they are not glaring to the eyes of the operator of the vehicle, thus eliminating the necessity for a glare shield or hood although these devices can be employed in conjunction with this type of windshield if so desired. Such a construction as hereinbefore set forth is capable of a considerable range of change and modification without departing from the spirit of my invention and I accordingly do not limit myself to such specific structure except as hereinafter claimed.

I claim:—

1. In combination with a windshield embodying the usual main frame, a frame supported thereby, a second frame pivoted to the first named frame and shiftable from a position paralleling the first named frame to a position at an angle to said frame, and means for maintaining the last named frame in a desired angular relation to the first named frame, glasses for said frames the glass of the outer frame having openings adjacent the upper end thereof, the glass of the lower frame having openings adjacent the lower edge thereof.

2. In combination with a windshield embodying the usual main frame, a frame supported thereby, a second frame pivoted to the first named frame and shiftable from a position paralleling the first named frame to a position at an angle to said frame, means for maintaining the last named frame in a desired angular relation to the first named frame, glasses for said frames the glass of the outer frame having openings adjacent the upper end thereof, the glass of the lower frame having openings adjacent the lower edge thereof, and a hood protecting the openings of the outer frame against the entry of water.

In testimony whereof I hereunto affix my signature.

WILLIAM A KLINGBERG.